Sheet 1 – 2 Sheets.
J. G. Millholland.
Slide Valve.
N° 92630. Patented Jul. 13, 1869.
Fig: 1.
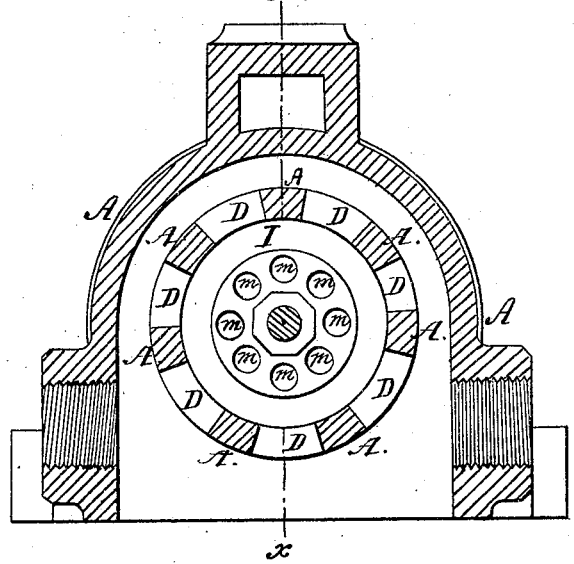
Fig: 2.
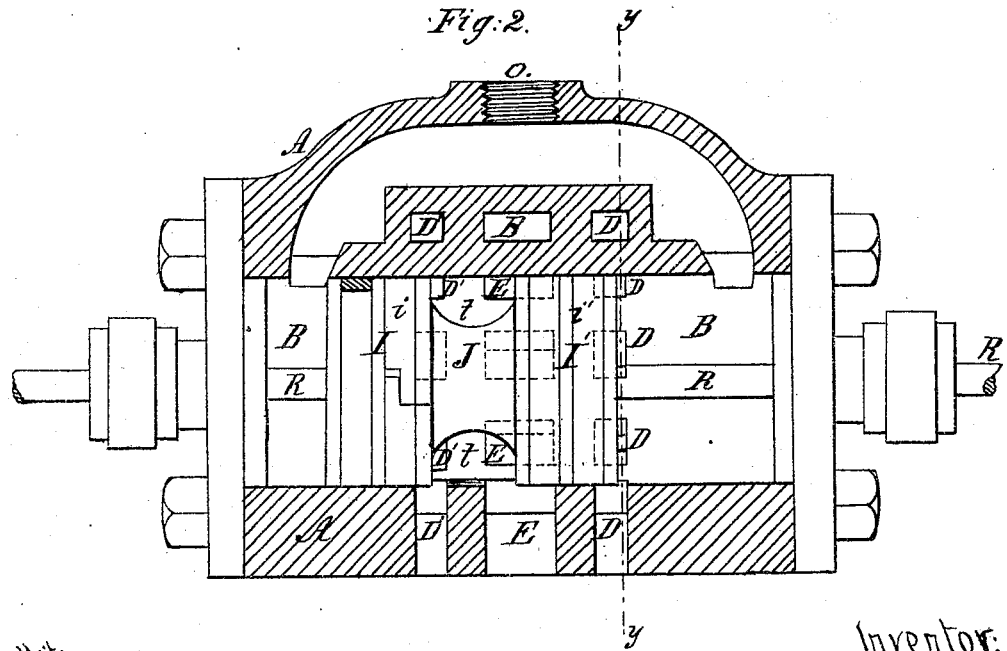
Witnesses:
C. A. Pettit
S. C. Kernon
Inventor:
J. G. Millholland
Munn & Co.
Attorneys.

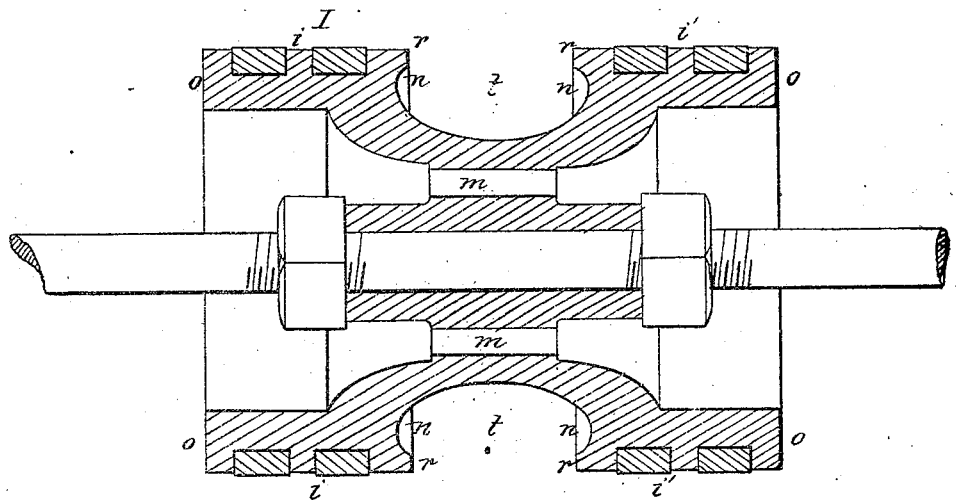

UNITED STATES PATENT OFFICE.

J. G. MILLHOLLAND, OF HARRISBURG, PENNSYLVANIA.

IMPROVEMENT IN BALANCED CYLINDRICAL SLIDE-VALVE.

Specification forming part of Letters Patent No. 92,630, dated July 13, 1869.

*To all whom it may concern:*

Be it known that I, J. G. MILLHOLLAND, of Harrisburg, in the county of Dauphin and State of Pennsylvania, have invented a new and Improved Balanced Cylindrical Slide-Valve; and I do hereby declare that the following is a full, clear, and exact description of the construction and operation of the same, reference being had to the accompanying drawings, making a part of this specification, in which—

Figure 1 is a cross-section through line $y\ y$ of Fig. 2. Fig. 2 is a vertical section through line $x\ x$ of Fig. 1.

This invention has for its object to improve the construction of balanced slide-valves in such a manner as to make the steam-pressure perfectly uniform and equal on all sides. This object is accomplished by arranging the live-steam ports and exhaust-ports on all sides of the slide-valve, and also providing steam-passages through the valve, in the manner which I will now proceed to describe in detail.

In the drawings, A represents the valve-chest, provided with the cylindrical valve-chamber B, to which live steam is fed from the throttle C through two series of ports, D D', arranged around the walls of the valve-chamber, so as to bring the live-steam pressure equally against all sides of the valve, and from which the steam is exhausted through a similar series of ports, E E, larger in size than the ports D D', and arranged midway between them.

The slide-valve I consists of a cylinder, having two annular bearing-surfaces, $i\ i'$, which work steam-tight in chamber B, and between which is an exhaust-groove, $t$, extending entirely around the valve, so that the side elevation of the valve is the same from every point of view. The ends of the valve are concave, having a projecting rim, $o\ o$, at the edge of the cylinder.

The side walls of the exhaust-groove $t\ t$ are also concave or recessed, as shown at $n\ n$, in a similar manner to the ends of the valve, and so as to leave projecting rim $r\ r$ along the adjacent edges of the two bearing-surfaces.

These edges $o\ o$, $r\ r$, or any of them, being made thin, in the manner described, can be readily turned off, so as to adjust the valve to any lead or lap that may be wanted, either on the steam or exhaust, and to work to any degree of expansion that may be desired.

Steam-passages $m\ m$ extend longitudinally through the valve, connecting the live steam in one end of chamber B with that in the other, and neutralizing the steam-pressure on the ends of the valve.

Having thus described my invention, what I claim as new, and desire to secure by Letters Patent, is—

1. The construction and arrangement of the longitudinally-sliding cylindrical valve I, circumferential groove $t$, and the two bearing-surfaces $i\ i'$, as described.

2. The arrangement of the series of ports D D' E on all sides of the valve-chamber, substantially as specified.

To the above specification of my invention I have signed my hand this 15th day of April, 1869.

J. G. MILLHOLLAND.

Witnesses:
SOLON C. KEMON,
CHAS. A. PETTIT.